US006636506B1

(12) United States Patent
Fan

(10) Patent No.: US 6,636,506 B1
(45) Date of Patent: Oct. 21, 2003

(54) INTERNET TELEPHONE SYSTEM AND METHOD THEREFOR

(75) Inventor: Yuan-Neng Fan, Scottsdale, AZ (US)

(73) Assignee: Fanstel Systems, LLC, Scottsdale, AZ (US)

( * ) Notice: Subject to any disclaimer, the term of this patent is extended or adjusted under 35 U.S.C. 154(b) by 0 days.

(21) Appl. No.: 09/192,761

(22) Filed: Nov. 16, 1998

(51) Int. Cl.[7] .............................................. H04L 12/66
(52) U.S. Cl. ...................................... 370/356; 370/352
(58) Field of Search ................................ 370/356, 351, 370/352, 400, 401, 402, 403, 389, 395, 465, 466, 467, 474; 379/90.01, 93.01, 93.05, 93.09, 100.15, 100.16

(56) References Cited

U.S. PATENT DOCUMENTS 5,463,616 A * 10/1995 Kruse et al. ................. 370/468
5,689,553 A * 11/1997 Ahuja et al. ................. 370/266
6,011,579 A * 1/2000 Newlin ......................... 348/15
6,181,736 B1 * 1/2001 McLaughlin et al. ........ 375/222
6,243,376 B1 * 6/2001 Ng et al. ...................... 370/352
6,353,611 B1 * 3/2002 Norris et al. ................. 370/356

* cited by examiner

Primary Examiner—Dang Ton
(74) Attorney, Agent, or Firm—Jeffrey D. Moy; Harry M. Weiss; Weiss, Moy & Harris, P.C.

(57) ABSTRACT

An internet telephone system is disclosed. The internet telephone system is comprised of an internet system, a public switched telephone network (PSTN) coupled to the internet system, and a plurality of internet telephone stations coupled to the PSTN. In the internet telephone system a first internet telephone station establishes a PSTN telephone connection to a remote number, and upon coupling to a second internet telephone station at the remote number, the first and the second internet telephone stations exchange their names and IP addresses, terminate the PSTN telephone connection and then automatically establish an internet telephone TCP/IP connection.

24 Claims, 3 Drawing Sheets

OPERATION ENVIRONMENT OF INTERNET TELEPHONES

OPERATION ENVIRONMENT OF INTERNET TELEPHONES

BLOCK DIAGRAM OF AN INTERNET TELEPHONE

BLOCK DIAGRAM OF FIRMWARE MODULE IN DSP

INTERNET TELEPHONE SYSTEM AND METHOD THEREFOR

BACKGROUND OF THE INVENTION

1. Field of the Invention

This invention is in the field of telephony and methods therefore. More particularly, this invention is an internet telephone system, and method therefor. The internet telephone system comprises a first internet telephone station that is used to make a regular telephone call, and upon detection of a second internet telephone station, both internet telephone stations exchange IP information and then automatically re-connect to each other using TCP/IP via the internet.

2. Description of the Related Art

Various types of internet telephony systems or methods exist today. These systems or methods generally fall into one of the following categories.

1. PC to PC Call:

This is the system most computers may be familiar with. This system or method uses a personal computer (PC) to establish communications with a second PC. The communication is established using add-on software and hardware to allow the PCs to convey the user's voices via an internet IP connection. This system and method has numerous drawbacks however. The two parties wishing to communicate must prearrange the date and time for the internet telephone call to take place. Both users must then establish an internet IP connection, which further requires the users to have previously exchanged correct internet IP address information.

2. PC to Phone Call:

A lessor known or used method is the PC to phone call method. A user places a modem telephone call to their internet service provider (ISP) with an internet telephone software equipped PC. An internet link is then established to a second ISP, or IT gateway, located proximate to the area to which it is desired to place a phone call to. The second ISP/IT gateway is then used by the user to place a phone call using the conventional phone systems to the desired local number. This method also has drawbacks however. An IT gateway must be available in the same local calling area as the called party. Otherwise, the user has to pay toll charges from the IT gateway to the called party, and while this may be a shorter distance than the full distance between the user and the number he wishes to call, the toll charges may still be substantial. Furthermore, the IT gateway typically charges a fee for the time connected. And finally, the user has to sign up for IT services with an IT gateway for each geographic area which he desires to place calls to. This IT gateway sign up typically includes a monthly subscription fee that must be paid regardless of use or non-use.

3. IT Phone Call to IT Phone Call

Another alternative method is the IT phone call to IT phone call. This method is very similar to the previous method except that regular phones are used at both ends of the call. A user places a regular telephone call to a first local IT gateway with a regular telephone. An internet link is then established from the first IT gateway to a second IT gateway located proximate to the area to which it is desired to place a phone call to. The second IT gateway is then used by the user to place a phone call using the conventional phone systems to the desired local number. This method also has drawbacks however. An IT gateway must be available at both ends, locally and, in the area to which it is desired to call. If an IT gateway is not available at either end, the user may actually have to pay double toll charges, one toll charge at the originating end and another toll charge at the receiving end. Furthermore, each IT gateway typically charges a fee for the time connected. And finally, the user has to sign up for IT gateway services with every IT gateway service provider for each geographic area which he desires to place calls to. This IT sign up typically includes a monthly subscription fee that must be paid regardless of use or non-use. It can be seen that this last method can be both cumbersome and could actually be quite expensive.

Therefor a need existed for a system and method to allow placing an internet phone call without the need to subscribe to any IT gateways, regardless of location.

Additionally, a need existed for a system and method of automatically placing an internet phone call with requiring any pre-arrangements between any of the parties.

Yet another need existed for a system and method of placing internet phone calls without requiring a PC to be loaded with special software or modified to place internet phone calls.

A final need existed for a system and method of placing a phone call to a party, automatically detecting the presence of a second internet telephone system at the called number and then automatically establishing an internet IP connection.

SUMMARY OF THE INVENTION

An object of the present invention is to provide a system and method to allow placing an internet phone call without the need to subscribe to any IT gateways, regardless of location.

Another object of the present invention is to provide a system and method of automatically placing an internet phone call with requiring any pre-arrangements between any of the parties.

Yet a further object of the present invention is to provide a system and method of placing internet phone calls without requiring a PC to be loaded with special software or modified to place internet phone calls.

An additional object of the present invention is to provide a system and method of placing a phone call to an party, and automatically detecting the presence of a second internet telephone system at the called number and then automatically establishing an internet IP connection.

BRIEF DESCRIPTION OF THE PREFERRED EMBODIMENTS

In accordance with one embodiment of the present invention, an internet telephone station is disclosed. The internet telephone station comprises: a DAA interface, wherein the DAA is coupled to a public switched telephone network (PSTN); an audio transceiver device coupled to the DAA; a CODEC circuit coupled to the DAA; a Digital Signal Processor (DSP) coupled to the CODEC; and ring and hook detect/control circuitry coupled to the DSP.

In accordance with another embodiment of the present invention, an internet telephone system is disclosed. The internet telephone system comprises: an internet system; a public switched telephone network (PSTN) coupled to the internet system; and a plurality of internet telephone stations coupled to the PSTN; wherein a first internet telephone station establishes a PSTN telephone connection to a remote number, and upon coupling to a second internet telephone station at the remote number, the first and the second internet telephone stations terminate the PSTN telephone connection and automatically establish an internet telephone connection.

In accordance with another embodiment of the present invention, a method of using the internet for voice communication is disclosed. The method of using the internet for voice communication comprises the steps of: selecting and dialing a remote telephone number via a non-internet communications system from a first internet capable telephone station, automatically detecting the presence of a second internet capable telephone station at the remote telephone number, automatically exchanging identification information between the first and second internet capable telephone stations, automatically disconnecting the first and second internet capable telephone stations from the non-internet communications system, and using the identification information to automatically establish communications between the first and second internet capable telephone-stations via an internet system.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 1:
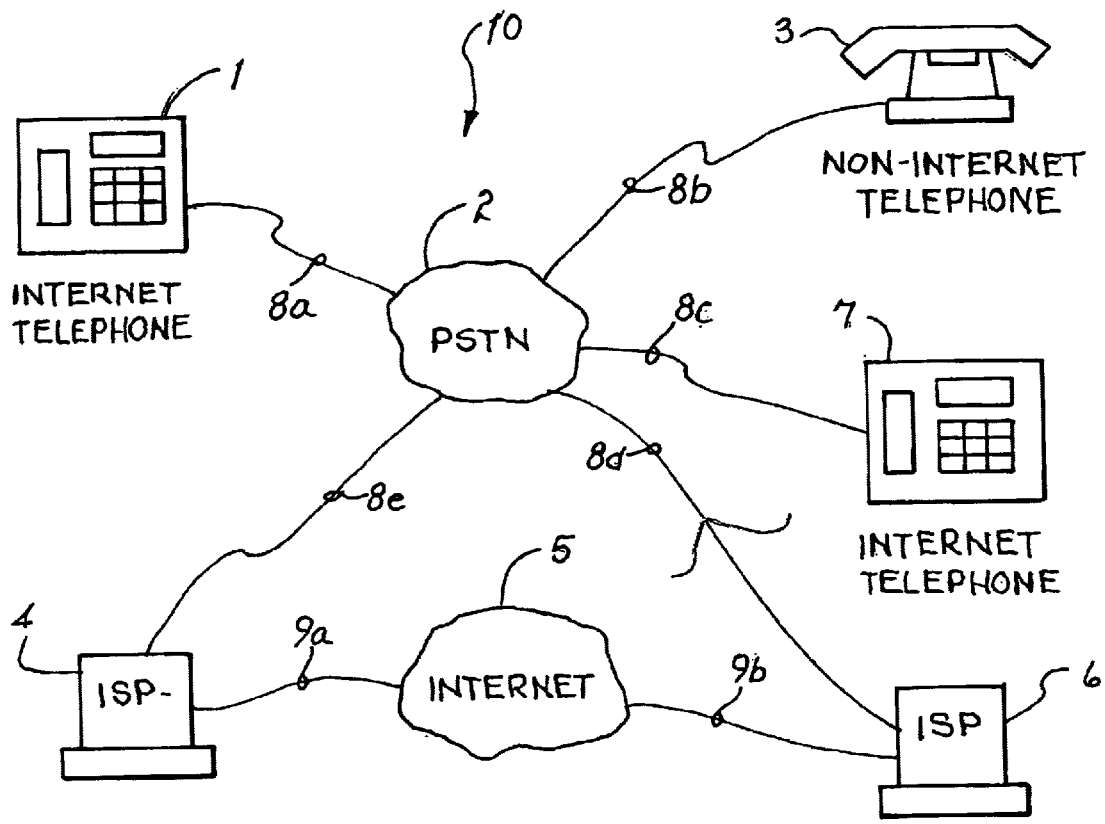
FIG. 1. is a simplified block diagram of the operating environment of the internet telephone system of the present invention.

Referring to FIG. 1, a simplified block diagram of the operating environment of the internet telephone system of the present invention, hereinafter the "system" 10, is shown. The system 10 preferably comprises a plurality of internet telephone stations 1 & 7 coupled together as described herein. The system 10 couples the internet telephone stations 1 and 7 through a Public Switched Telephone Network 2 (PSTN). A PSTN 2 may be comprised of: a Plain Old Telephone Service (POTS); an Integrated Service Digital Service, (ISDN) line; mobile telephone wireless connection, including such systems as cellular, PCS, or GSM system; or any other access media to a PSTN network. The connection means, regardless of whether POTS, ISDN, etc. are depicted in FIG. 1 by lines 8a–e coupling the internet telephone stations 1 and 7 via the PSTN 2 to a non-internet telephone 3 via line 8b, to the internet service providers (ISPs) 4 and 6 via lines 8e and 8d, and to an internet 5 via lines 9a–b.

The system 10 comprises the equipment, systems, and method to enable automatically placing, or routing, telephone calls via the internet 5. This allows the users of the system 10 to make use of a more cost efficient means of making telephone calls than is possible using the PSTN 2 system solely.

In a preferred embodiment, internet telephone station 1 places a telephone call via the PSTN 2. Depending on the number called, and the installed equipment at the called number, one of thee cases will occur as described by the following overview descriptions:

Case 1. Internet Telephone to Non-internet Telephone Connection

In this case, an internet telephone station 1 is used to place a call to a standard telephone number in any location. It should be noted that the internet telephone stations 1 and 7 are identical in form and function and that the description of the usage and functions of the system 10 originates with internet telephone station 1 as a matter of convenience, but those skilled in the art will recognize that either internet telephone station 1 or 7 may be used to establish internet telephone calls. The standard telephone number called may be local or remote including international locations. If the standard telephone number called is coupled to a non-internet telephone 3, the non-internet telephone 3 rings in a conventional manner, and once the call is answered at the called location the communications between the user's of the internet telephone station 1 and the non-internet telephone station 3 proceed in a conventional manner.

Case 2. Internet Telephone to Internet Telephone Connection

In this case, an internet telephone station 1 is again used to place a call to a standard telephone number in any location. In this case however, a second internet telephone station 7 is coupled to the PSTN 2 at the called telephone number. The second internet telephone station 7 answers the telephone call at the first ring. The first internet telephone station 1 and the second internet telephone station 7 now exchange information as follows: the caller's telephone number, name, and IP address are transmitted to the second internet telephone station 7, and the IP address of the called second internet telephone station 7 is transmitted back to the first internet telephone station 1. Following the exchange of information both the first and second internet telephone stations 1 and 7 automatically hangup their phones thus breaking the PSTN connection. The exchange of information between the first and second internet telephone stations 1 and 7, followed by the hangup and disconnect of the PSTN connection is substantially transparent to the users of the first and second telephone stations 1 and 7. Following the disconnect of the PSTN connection, the first and second internet telephone stations 1 and 7 automatically dial their ISPs 4 and 6 respectively The internet telephone stations 1 and 7 establish a TCP/IP connection with their ISPs 4 and 6. (Transmission Control Protocol/Internet Protocol (TCP/IP) is the main transport protocol used on the Internet for connectivity and transmission of data across heterogeneous systems.)

The first and second internet telephone stations 1 and 7 next establish a TCP/IP link between them via the internet by using the IP address information previously exchanged. The user's voice signals, at the first and second internet telephone stations 1 and 7, are digitized by the internal circuitry of the internet telephone station 1 or 7 and sent to the corresponding ISP 4 and 6 respectively with the destination EP address of the other internet telephone station 7 and 1 respectively. The digitized voice packets are received by the first and second internet telephone stations 1 and 7 and converted back to voice signals. In this manner a telephone call is made via the internet that to outward appearances is a substantially conventional telephone call, though in actuality the major portion of the telephone call utilizes the internet.

Case 3. Internet Telephone to a Busy-telephone Number

In this case, an internet telephone station 1 is again used to place a call to a standard telephone number in any location, again starting with a PSTN 2 connection. In this case however, a busy signal is present at the called number. The first internet telephone station 1 now checks its internal database in order to determine if the number being called is a known location of an internet telephone station 7. If the number being called is not programmed into the first internet telephone station 1, then a default choice is made that the number being called uses an unknown telephone station. For this situation, the first internet telephone station 1 will continue the PSTN 2 connection attempt until the user of the first internet telephone station 1 hangs up the handset thus stopping the connection attempt. However, if the number being called is listed in the internal database of the first internet telephone station 1 and includes the IP address of a second internet telephone station 7 at the called number, then the first internet telephone station 1 will disconnect from the PSTN 2, and automatically place a telephone call to its ISP 4.

Upon establishing a TCP/IP link to its ISP 4 the first, internet telephone station 1 will transmit an "incoming call notification packet" to the IP address of the second internet telephone station 7 as registered in the internal database of the first telephone station 1. The user of the second internet telephone station 7 upon receipt of the incoming call notification packet by the second internet telephone station 7, may choose to transmit a response back to the first internet telephone station 1 indicating that the user of the second internet telephone station 7 intends to respond, or answer, the incoming telephone call. The user at the second internet telephone station 7 then finishes the current phone call, disconnects from the third party's IP address and then establishes a TCP/IP link to the waiting first internet telephone station 1 where the original caller has been waiting. The user's voice signals, at the first and second internet telephone stations 1 and 7, are digitized and packetized by the internal circuitry of the internet telephone station 1 or 7 and sent to the corresponding ISP 4 and 6 respectively with the destination IP address of the other internet telephone station 7 and 1 respectively. The digitized voice packets are received by the first and second internet telephone stations 1 and 7 and converted back to voice signals. In this manner a telephone call is made via the internet that to outward appearances is a substantially conventional telephone call, though in actuality the major portion of the telephone call utilizes the internet 5. More particularly, as shown in this example, the first internet telephone station 1 recognized the busy signal and because the correct IP information was contained within its internal database, an "incoming call notification packet" was transmitted to the second internet telephone station 7 and thus a TCP/IP connection was able to be established between the first and second internet telephone stations 1 and 7. This feature works much as call waiting functions in a conventional, non-internet telephone system.

An additional feature when dealing with busy signals is that because the busy signal triggers an assumption by the calling first internet telephone station 1 that the user at the called number is actually using the telephone circuit, an attempt may be made to contact an internet telephone capable PC loaded with the correct software. This feature works if the correct information of the called party is entered in the database of the calling first internet telephone station 1. As discussed above, the first internet telephone station 1 establishes a TCP/IP connection with the internet following the busy signal, and then attempts a connection with the called number. If the called person has the correct internet telephone software loaded onto their personal computer, the personal computer may then function as, and actually be the second internet telephone station 7.

Figure 2:
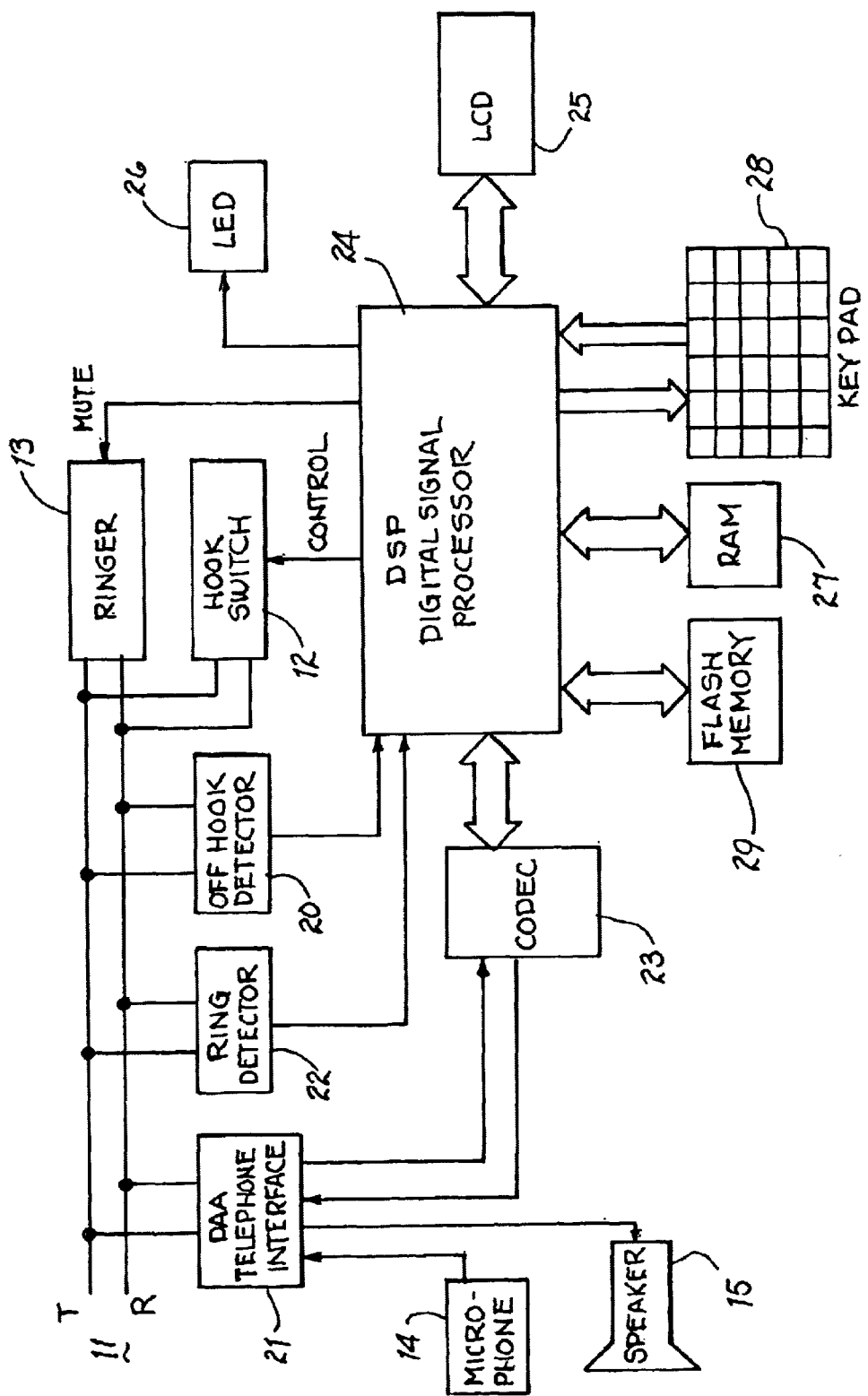
FIG. 2. is a block diagram of an internet telephone station used in the internet telephone system shown in FIG. 1.

Elaborating on the above overview, the internet telephone system and method, in a preferred embodiment, functions as follows: Referring to FIG. 2, a block diagram of an internet telephone station 1 and 7, in accordance with the present invention is shown. The internet telephone station 1 and 7 is coupled to an external telephone line 11. An internet telephone station 1 or 7 is preferably comprised of: a Digital Signal Processor (DSP) 24, an LCD display 25, a keypad 28, FLASH memory 29, Random Access Memory (RAM) 27, a ring detector 22, a Digital-Analog-Analog (DAA) telephone line interface 21, an off hook detector 20, a CODEC 23 (Coder-DECoder—a hardware circuit that converts analog sound or speech to digital code, inclusive of both analog to digital and digital to analog conversion), an electronic hook switch 12, a ringer 13, a microphone 14 and speaker 15. The ring detector 22, the DAA telephone line interface 21, the off hook detector 20, the hook switch 12, and the ringer 13 have their input terminals coupled to the external telephone line 11. The CODEC 23 is coupled to and receives analog signals from the DAA telephone line interface 21 and converts them into digital signals for processing by the DSP 24, to which the DAA telephone line interface 21 is coupled.

The LCD 25 is coupled to the DSP 24 for display of the telephone number, name, and ISP/IP address entered by the user from the keypad 28 which is also coupled to the DSP 24. The FLASH memory 29 and the RAM 27 are both coupled to the DSP 24. The Firmware program, shown in FIG. 3; telephone numbers; names; and ISP/IP addresses are stored in the FLASH memory 29. The RAM 27, also coupled to the DSP 24, is used as a scratch pad during Firmware program execution.

Figure 3:
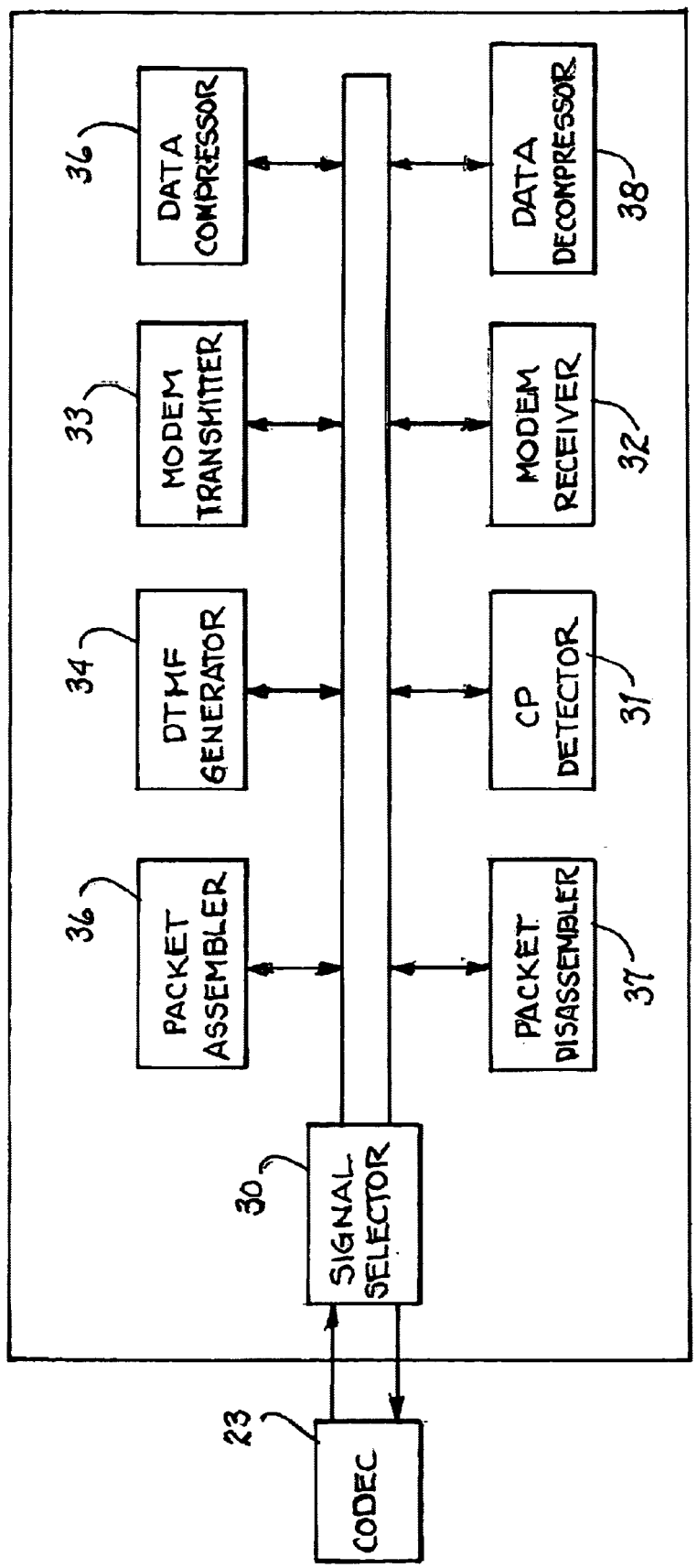
FIG. 3. is a block diagram of the Firmware Module used in the DSP of the internet telephone station shown in FIG. 2.

Referring to FIG. 3, a block diagram of Firmware features implemented in the DSP 24 are shown. The Firmware features are: signal selector 30, packet assembler 36, packet disassembler 37, DTMF generator 34, Call Progress (CP) detector 31, MODEM transmitter 33, MODEM receiver 32, data compressor 36, and data decompressor 38.

Referring to FIGS. 1–3, the functional operation of the first and second internet telephone station 1 and 7 is as follows. The calling, first internet telephone station 1, dials the selected telephone number by sending DTMF (Dual Tone Multiple Frequencies) to the local telephone company, PSTN 2. The DTMF dialing is a traditional hardware function implemented in an internet telephone station 1 or 7 as a Firmware feature. Referring to FIG. 2, the DTMF generator 34 sends DTMF signals to a signal selector 30. The DTMF signals are converted into an analog signal by the CODEC 23 and sent to the telephone line 11 through the DAA telephone line interface 21. The telephone company, PSTN 2, make a connection to the dialed telephone number and sends ringing voltage down the telephone line 8b.

If the first internet telephone station 1 detects only one ring tone it will assume that a second internet telephone station 7 has answered the call, and the first internet telephone station 1 will mute its microphone 14 and speaker 15. If however, the called telephone is a non-internet telephone 3, it will ring continuously till an end user answers the call thus resulting in multiple-ring tones received by the first internet telephone station 1. In the case of a non internet telephone station 3 that is answered on the first ring, even though the first internet telephone station 1 will mute its microphone 14 and its speaker 15, upon failing to receive a data packet including the called telephone's IP address and user's information, the first internet telephone station 1 microphone 14 and the speaker 15 are un-muted and the establishment of a POTS telephone call connection continues. If the called telephone is an internet telephone station 7, the ring detector 22 detects the incoming ring voltage and informs the DSP 24 of the arrival of ring voltage. Upon receipt of a first ring voltage, the DSP 24 of the called second internet telephone station 7 disables the ringer 13 to avoid having the end user lift the telephone handset in response to further ring voltage signals. The called second internet telephone station 7 DSP 24 activates the electronic hook switch 12 to close the loop of the telephone line 11 and answer the incoming call, and mutes the microphone 14, and the speaker 15 to allow MODEM data transmission. At the calling internet telephone station 1, the signal at the telephone line 11, from the PSTN 2 network, is converted to 4-wire interface by the DAA telephone line interface 21, digitized by the CODEC 23, and then sent to the CP Detector 31, Firmware module, inside the DSP 24. If more than one ringing tone is detected, the called telephone number is a POTS (Plain Old Telephone Service) telephone. The ringing of the called number, now determined to be a non internet telephone 3, will be continued by the calling first internet telephone station 1 till. answered by the called party or the calling user at the first internet telephone station 1 hangs up.

However, If the calling internet telephone station 1 detects only one duration of the ringing tone, then it is assumed that this call has been answered by a compatible second internet telephone station 7. The exchange of user's information can begin between the first and second internet telephone stations 1 and 7 may now begin. The DSP 24 of both the first and second internet telephone station 1 and 7 will flash the LED 26 to indicate the exchange of user's information, i.e. name, IP address etc. In the event that the exchange of information between the first and second internet telephone stations 1 and 7 fails, each internet telephone station upon not receiving the other station's name and IP address information will un-mute the microphone 14 and the speaker 15, and for the called internet telephone station, activate the ringer 13. This failure to exchange name and IP address information will result in the phone call proceeding as a regular POTS phone call via the PSTN 2.

Proceeding with the establishment of an internet telephone call connection, the DSP 24 in the calling first internet telephone station 1 retrieves its telephone number, user's name, and IP address from its FLASH memory 29. This information is then assembled by the DSP 24 into a data package and converted into a MODEM digital format signal by the MODEM Transmitter 33. The MODEM digital format signal is sent to the CODEC 23 through the signal selector 30. The CODEC 23 converts the MODEM digital format signal into a MODEM analog format signal and sends it to the telephone line 11 through the DAA Interface 21. The called second internet telephone station 7 receives this MODEM analog format signal at the DAA telephone line interface 21. The MODEM analog format signal is converted back into a MODEM digital format signal by the CODEC 23, sent to the MODEM Receiver 32 via the signal selector 30. The DSP 24 disassembles the data packet from the MODEM receiver 32, and displays the calling party's telephone number and name on the LCD 25. It also stores the calling party's number, name and IP address in its FLASH memory 29.

The DSP 24 in both the calling first internet telephone station 1 and the called second internet telephone station 7 now deactivate their electronic hook switches 12, respectively, to place the telephone handsets on-hook, thus breaking the connection via the PSTN 2 network. After approximately 2 seconds of delay, each DSP 24 activates its electronic hook switch 12 to place the telephone handsets to the off-hook state in preparation for establishing the internet 5 connection.

The DTMF generator 34 of the first and second internet telephone stations 1 and 7 next sends the telephone numbers of their ISPs 4 and 6 respectively through the signal selector 30, the digital signal is converted into an analog signal by the CODEC 23. The DTMF signal in analog format is sent to telephone line 11 via the DAA telephone line interface 21. Upon receipt of the DTMF signal, the PSTN 2 connects each call to their respective ISP 4 or 6. When the CP tone detector 31 detects the end of ringing tones thus indicating connection to the ISP, it informs the MODEM transmitter 33 to begin transmission of a MODEM signal training sequence at a speed of 14.4 kbps and then sends a beginning-of-conversation protocol to the IP address of the called second internet telephone station 7. Upon receipt of beginning-of-conversation protocol from the called second internet telephone station 7, the first internet telephone station 1 provides a distinctive ringing signal to the user. When the user of the second internet telephone station 7 lifts the handset to answer the telephone call, the off-hook detector 20 signals the DSP 24 to begin conversion of the incoming voice data to a voice signal output by the speaker 15. The called second internet telephone station 7 now sends packetized voice data to the IP address of the calling first internet telephone station 1 to establish 2-way voice communication.

After the connection of the internet telephone station 1 or 7 to the respective ISP 4 or 6, the CODEC 23 begin to receive the voice signals of each respective user through their microphone 14 and the CODEC 23 sends this signal to the DAA telephone line interface 21. The DAA telephone line interface 21 digitizes the voice signal at 8 k bytes per second or 64 kbps. The digitized voice signal is then sent to the Data Compression 36 module to be compressed using the GSM algorithm to 13 kbps or the ITU G.723. 1 algorithm to about 6 kbps.

The GSM algorithm, developed at the Technical University Of Berlin in 1992, is one of the most complex audio compression methods in use, providing a compression ratio of 10 to 1. The GSM algorithm is based on the Global System for Mobile telecommunication protocol that is currently the most popular European protocol for digital cellular phones. The European GSM 06.10 provisional standard for full-rate speech transcoding, PRI-ETS 300 036, uses RPE/LTP (residual pulse excitation/long term prediction) coding at 13 kbit/s. The quality of the algorithm is good enough for reliable speaker recognition; even music often survives transcoding in recognizable form (given the bandwidth limitations of 8 kHz sampling rate) GSM is a digital system, so speech which is inherently analog, has to be digitized. The GSM algorithm is a Regular Pulse Excited-Linear Predictive Coder (RPE-LPC) with a Long Term Predictor loop. Basically, information from previous samples, which does not change very quickly, is used to predict the current sample. The coefficients of the linear combination of the previous samples, plus an encoded form of the residual, the difference between the predicted and actual sample represent the signal. Speech is divided into 20 millisecond samples; each of which is encoded as 260 bits, giving a total bit rate of 13 kbps.

The ITU G.723. 1 algorithm is the International Telecommunications Union Recommendation No. G.723.1, Titled: Dual rate speech coder for multimedia communications transmitting at 5.3 and 6.3 kbit/s, was adopted in March 1996. This recommendation specifies a coded representation that can be used for compressing the speech or other audio signal component of multi-media services at a very low bit rate as part of the overall H.324 family of standards. This coder has two-bit rates associated with it, 5.3 and as used in the present invention 6.3 kbit/s. The higher bit rate has greater quality thus making its choice desirous. This coder was optimized to represent speech with a high quality at the above rates using a limited amount of complexity. It encodes speech or other audio signals in frames using linear predictive analysis-by-synthesis coding. The excitation signal for the high rate coder is Multipulse Maximum Likelihood Quantization (MP-MLQ) and for the low rate coder is Algebraic-Code-Excited Linear-Prediction (ACELP). The frame size is 30 ms and there is an additional look ahead of 7.5 msec, resulting in a total algorithmic delay of 37.5 msec. All additional delays in this coder are due to processing delays of the implementation, transmission delays in the communication link and buffering delays of the multiplexing protocol.

The data packet assembler 36 assembles the compressed data with the IP address of the called second internet telephone station 7. The data packet is sent to the MODEM transmitter 33, via the signal selector 30, via the CODEC 23, through the DAA telephone line interface 21, then to the telephone line 11. A voice transmission path is thus established from the first internet telephone station 1 to the second internet telephone station 7. At the same time, the called internet telephone station 7 calls its ISP 6 and begin transmission of packetized voice signals coded with the calling internet telephone station 1's IP address.

The internet telephone station 1 receives the MODEM signal from the telephone line 11. The DAA telephone line interface 21, receives the MODEM signal therefrom, sends it to the CODEC 23, and ultimately to the MODEM receiver 32 which converts the MODEM signal into data packets. These data packets are sent to the data disassembler 37 to remove the IP address and other overhead bytes to obtain compressed data. The compressed data is sent to the data decompressor 38 to be converted into 64 kbps data. The 64 kbps data is converted into an analog signal, sent via the signal selector 30 and the CODEC 23 to the DAA telephone line interface 21, and finally to the speaker 15 thus establishing a voice reception path.

When either the first or second internet telephone station 1 or 7 detects an on hook condition by the off hook detector 20, (either in response to a hang up or non-response following a sufficient time period), the first or second internet telephone station 1 or 7 stops sending voice packets, and sends an end-of-conversation protocol to the IP address of the other second or first internet telephone station 7 or 1. The receipt of the end-of-conversation protocol transmission, or a period of time without the receipt of any voice packets, signals the receiving first or second internet telephone station 1 or 7 to apply background noise to its respective speaker 15 to signal that the other party has ended the internet telephone call by hanging up.

Additional features or variations in operation of the internet telephone stations comprise the ability to: allow a user to enter the user's own telephone number, name, and IP address into an internal database; enter the telephone numbers and e-mail/IP addresses into an internal data base for known parties that will be called; if a first or second internet telephone station 1 or 7 receives an incoming call from a non internet telephone, the called first or second internet telephone station 1 or 7 answers the incoming call at the first ring by activating its electronic hook switch to go into off-hook state. If the calling party's IP information is not received this is indicative of a call from a non internet telephone station 3, and the called first or second internet telephone station 1 or 7 plays a pre-recorded message to inform the caller to hold. The called first or second internet telephone station 1 or 7 activates its electronic ringer 13 to inform the user a call has been received from a non-internet telephone 3.

Although the invention has been particularly shown and described with reference to a preferred embodiment thereof, it will be understood by those skilled in the art that changes in form and detail may be made therein without departing from the spirit and scope of the invention.

What is claimed is:

1. An internet telephone station which can make telephone calls through a standard PSTN system and through an internet system comprising:
   a DAA interface wherein said DAA is coupled to a public switched telephone network (PSTN);
   an audio transceiver device coupled to said DAA;
   a CODEC circuit coupled to said DAA;
   a Digital Signal Processor (DSP) coupled to said CODEC for exchanging user information with another internet telephone and for establishing an internet telephone call between parties via IP addresses of both parties by using said identification information to automatically establish communications between said first and second internet capable telephone stations via an internet system and disconnecting said first internet capable telephone station from a non-internet communication system when said first internet capable telephone station detects a busy signal at a remote number then automatically establishing an internet connection when said first internet capable telephone station detects a busy signal at said remote number and transmitting a call waiting signal to said second internet capable telephone station located at said remote number when said first internet capable telephone station detects a busy signal at said remote number; and
   ring and hook detect/control circuitry coupled to said DSP for monitoring incoming ring voltage and to determine if an incoming call is from a second internet telephone or a non-internet telephone.

2. The system of claim 1 wherein said DSP comprises a packet disassembler coupled to said CODEC.

3. The system of claim 2 wherein said DSP comprises a packet assembler coupled to said CODEC.

4. The system of claim 1 wherein said DSP comprises a MODEM transmitter coupled to said CODEC.

5. The system of claim 4 wherein said DSP comprises a MODEM receiver coupled to said CODEC.

6. The system of claim 1 wherein said DSP comprises a data compressor coupled to said CODEC.

7. The system of claim 6 wherein said DSP comprises a data de-compressor coupled to said CODEC.

8. An internet telephone system, comprising, in combination:
   an internet system;
   a public switched telephone network (PSTN) coupled to said internet system; and
   a plurality of internet telephone stations coupled to said PSTN, wherein a first internet-telephone station establishes a PSTN telephone connection to a remote number, and upon coupling to a second internet telephone station at said remote number, said first and second internet telephone stations terminate said PSTN telephone connection and automatically establish an internet telephone connection wherein said first internet telephone and said second internet telephone comprises:
      a DAA interface wherein said DAA is coupled to a public switched telephone network (PSTN);
      an audio transceiver device coupled to said DAA;
      a CODEC circuit coupled to said DAA;
      a Digital Signal Processor (DSP) coupled to said CODEC for exchanging user information with another internet telephone and for establishing an internet telephone call between parties via IP addresses of both parties by using said identification information to automatically establish communications between said first and second internet capable telephone stations via an internet system and disconnecting said first internet capable telephone station from a non-internet communication system when said first internet capable telephone station detects a busy signal at a remote number then automatically establishing an internet connection when said first internet capable telephone station detects a busy signal at said remote number and transmitting a call waiting signal to said second internet capable telephone station located at said remote number when said first internet capable telephone station detects a busy signal at said remote number; and ring and hook detect/control circuitry coupled to said DSP for monitoring incoming ring voltage and to determine if an incoming call is from a second internet telephone or a non-internet telephone.

9. The system of claim 8 wherein said PSTN further comprises at least one plain old telephone set (POTS) coupled to said PSTN.

10. The system of claim 9 wherein said first internet telephone station establishes said PSTN telephone connection with said POTS.

11. The system of claim 8 wherein said PSTN is from the group consisting of non-internet telephony systems.

12. The system of claim 8 wherein said plurality of internet telephone stations further comprises an internet capable personal computer.

13. The system of claim 8 wherein each of said plurality of internet telephone stations comprises busy signal response circuitry to establish said internet telephone connection with an in-use unit of said plurality of internet telephone stations.

14. The system of claim 8 wherein said DSP comprises a packet disassembler coupled to said CODEC.

15. The system of claim 14 wherein said DSP comprises a packet assembler coupled to said CODEC.

16. The system of claim 8 wherein said DSP comprises a MODEM transmitter coupled to said CODEC.

17. The system of claim 16 wherein said DSP comprises a MODEM receiver coupled to said CODEC.

18. The system of claim 8 wherein said DSP comprises a data compressor coupled to said CODEC.

19. The system of claim 18 wherein said DSP comprises a data de-compressor coupled to said CODEC.

20. A method of using the internet for voice communication comprising the steps of:

selecting and dialing a remote telephone number via a non-internet communication system from a first internet capable telephone station;

automatically detecting the presence of a second internet capable telephone station at said remote telephone number;

automatically exchanging identification between said first and second internet capable telephone stations;

automatically disconnecting said first and second internet capable telephone stations from said non-internet communications systems;

using said identification information to automatically establish communications between said first and second internet capable telephone stations via an internet system;

disconnecting said first internet capable telephone stations from said non-internet communication system when said first internet capable telephone station detects a busy signal at said remote number;

automatically establishing an internet connection when said first internet capable telephone station detects a busy signal at said remote number; and transmitting a call waiting signal to said second internet capable telephone station located at said remote number when said first internet capable telephone station detects a busy signal at said remote number.

21. The method of claim 20 further comprising the step of automatically establishing audio communications between said first internet capable telephone station and a plain old telephone set (POTS).

22. The method of claim 20 further comprising the step of establishing audio communications between said first internet capable telephone station and the previously busy said second internet capable telephone station.

23. The method of claim 20 further comprising the steps of:

detecting a busy signal at said remote number;

disconnecting said first internet capable telephone stations from said non-internet communications system;

automatically establishing an internet connection; and transmitting a call waiting signal to an internet telephone capable computer system located at said remote number.

24. The method of claim 23 further comprising the step of establishing audio communications between said first internet capable telephone stations and the previously busy said internet telephone capable computer system.

* * * * *